US006366844B1

(12) United States Patent
Woywod et al.

(10) Patent No.: US 6,366,844 B1
(45) Date of Patent: Apr. 2, 2002

(54) METHOD AND DEVICE FOR LIMITING TRANSVERSAL ACCELERATION IN A MOTOR VEHICLE

(75) Inventors: Jürgen Woywod, Mörfelden; Ralph Gronau, Wetter; Dieter Burkhard, Waldfischbach-Burgalben; Hans-Georg Ihrig, Darmstadt; Lothar Kienle, Lampertheim, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/581,841

(22) PCT Filed: Nov. 25, 1998

(86) PCT No.: PCT/EP98/07601

§ 371 Date: Sep. 8, 2000

§ 102(e) Date: Sep. 8, 2000

(87) PCT Pub. No.: WO99/30941

PCT Pub. Date: Jun. 24, 1999

(30) Foreign Application Priority Data

| Dec. 16, 1997 | (DE) | 197 55 761 |
| Apr. 18, 1998 | (DE) | 198 16 430 |
| Jul. 6, 1998 | (DE) | 198 30 190 |

(51) Int. Cl.⁷ .................................................. B60T 8/00
(52) U.S. Cl. .......................... 701/83; 701/84; 303/140; 303/146
(58) Field of Search ............................. 701/83, 82, 84, 701/72; 303/140, 146, 147

(56) References Cited

U.S. PATENT DOCUMENTS

| 4,898,431 A | | 2/1990 | Karnopp et al. |
| 4,976,330 A | * | 12/1990 | Matsumoto ................. 180/197 |
| 5,704,696 A | * | 1/1998 | Monzaki ..................... 303/146 |
| 5,869,943 A | * | 2/1999 | Nakashima et al. ........ 318/586 |

(List continued on next page.)

FOREIGN PATENT DOCUMENTS

| DE | 41 23 234 | 8/1992 |
| DE | 41 23 232 | 1/1993 |
| DE | 44 30 458 | 2/1996 |
| DE | 196 49 137 | 6/1997 |
| DE | 196 02 994 | 7/1997 |
| DE | 196 02 879 | 8/1997 |
| DE | 196 07 050 | 8/1997 |
| DE | 197 03 668 | 8/1997 |
| DE | 197 21 299 | 12/1997 |
| DE | 196 32 943 | 2/1998 |
| DE | 197 08 508 | 3/1998 |
| DE | 197 46 889 | 5/1998 |

OTHER PUBLICATIONS

Fennel: "ABS plus und ESP—Ein Konzept zur Beherrschung der Fahrdynamik", ATZ, vol. 100, pp. 302–308 (1998).
Van Zanten et al.: "Die Fahrdynamik–regelung von Bosch", at –Automatisierungs–technik, vol. 44, Issue 7, pp. 359–365 (1996).

*Primary Examiner*—Michael J. Zanelli
(74) *Attorney, Agent, or Firm*—Rader, Fishman & Grauer PLLC

(57) ABSTRACT

A method for limiting the transverse acceleration of a traveling vehicle consisting of the steps: detection of a driving condition with a critical transverse acceleration, influencing the braking pressure on at least one wheel, and/or influencing the driving torque when the driving condition having a critical transverse acceleration has been detected. A device for limiting the transverse acceleration of a traveling vehicle has a detection device for detecting a driving condition with a critical transverse acceleration, and an influencing device for influencing the braking pressure on at least one wheel and/or for influencing the driving torque when the detection device has detected a driving condition with a critical transverse acceleration.

21 Claims, 5 Drawing Sheets

U.S. PATENT DOCUMENTS 5,931,546 A * 8/1999 Nakashima et al. ........ 303/146
5,968,105 A * 10/1999 Burkhard et al. ............. 701/70
6,077,190 A * 6/2000 Tabata et al. .................. 477/97
6,086,168 A * 7/2000 Rump ........................ 303/191

* cited by examiner

METHOD AND DEVICE FOR LIMITING TRANSVERSAL ACCELERATION IN A MOTOR VEHICLE

TECHNICAL FIELD

The present invention relates to a method and a device for limiting the transverse acceleration of a traveling vehicle.

BACKGROUND OF THE INVENTION

Vehicles such as off-road vehicles or minibuses are driven to an increasing extent which have a very good road contact (i.e. traction), on the one hand, and a comparatively high center of gravity, on the other hand. This may cause problems inasmuch as the transverse forces which are transmitted due to the good road contact are of so great an amount that the resulting centrifugal force causes the vehicle to tilt. The physical relationship will be explained briefly by way of FIG. 2.

The embodiment of FIG. 2 shows schematically the rear of a vehicle 210 on a road surface 200. Reference numerals 103 and 104 represent the wheels on the rear axle. It shall be assumed that the vehicle drives in a right bend, that is, would move to the right in a projection to the drawing plane. Due to the vehicle driving on a circular course, a centrifugal force $Z = m \cdot \omega^2 \cdot r = mv^2/r$ is produced, with m being the vehicle mass, o being the angular velocity in the circular course, v being the vehicle speed and r the radius of the circular course. The centrifugal force Z that acts and may be expressed as the product aq.m, with aq being the transverse acceleration, may be considered as acting upon the point of gravity S of the vehicle. The point of gravity S is disposed roughly centrically between the wheels and at a height h above the road surface. Also, the weight force $G = m \cdot g$ acts upon the point of gravity S, with g being the acceleration due to gravity. As long as the vehicle drives on the desired circle ($aq = v^2/r$ then applies), that is as long as the cornering forces F on the four wheels (approximately corresponding to $F = \mu \cdot G$, with $\mu$ being the coefficient of friction between tires and road surface) are equal to the centrifugal force Z, the mentioned centrifugal forces will be produced according to the above equation. It may happen in this case that the vehicle rolls over the outward wheel due to an unfavorable distribution of torques. This will principally happen when $G \cdot b/2 < Z \cdot h$ applies, with h being the level of the point of gravity S above the road surface 200 and b/2 being roughly half the track width of the vehicle. The above unbalanced equation represents in a first approximation the torque balance around point P. When the outward turning torque $Z \cdot h$ is greater than the inwards turning torque $G \cdot b/2$, the vehicle will tilt outwards. This risk is especially imminent in vehicles having a small track width (b/2 small) and a comparatively great height and, thus, a high point of gravity (great value of h), e.g. due to a roof load 220 on vehicle 210.

In order to be able to avoid such an operating condition, it is necessary
- to detect a critical situation, especially a driving condition with a critical transverse acceleration, and
- to take appropriate countermeasures after the detection.

An object of the present invention is to provide a simple and reliable method and a corresponding device for limiting the transverse acceleration of a traveling vehicle.

DETAILED DESCRIPTION OF THE PREFERRED EMBODIMENTS

Figure 1:
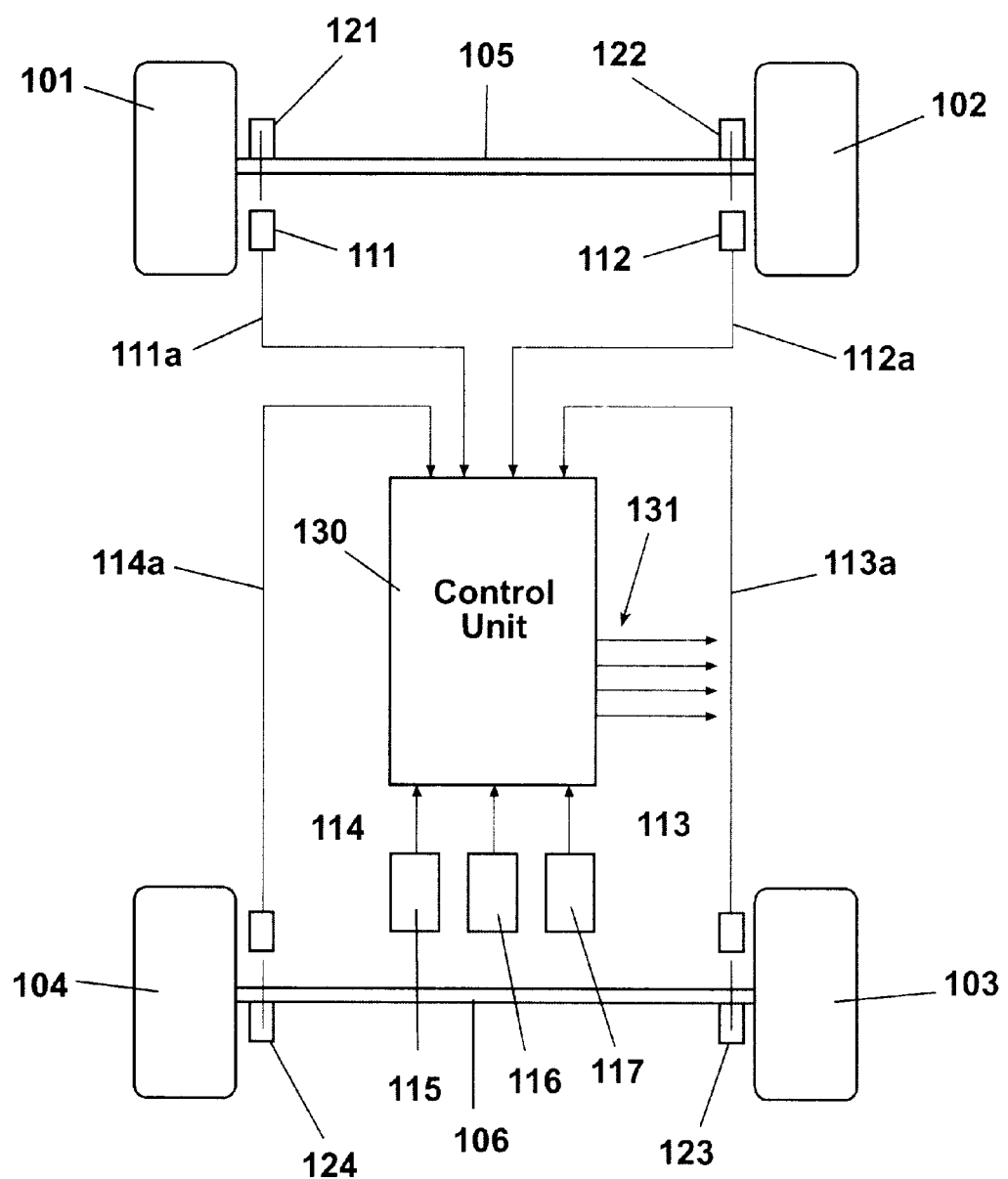
FIG. 1 is a schematic top view of a vehicle.
Figure 2:
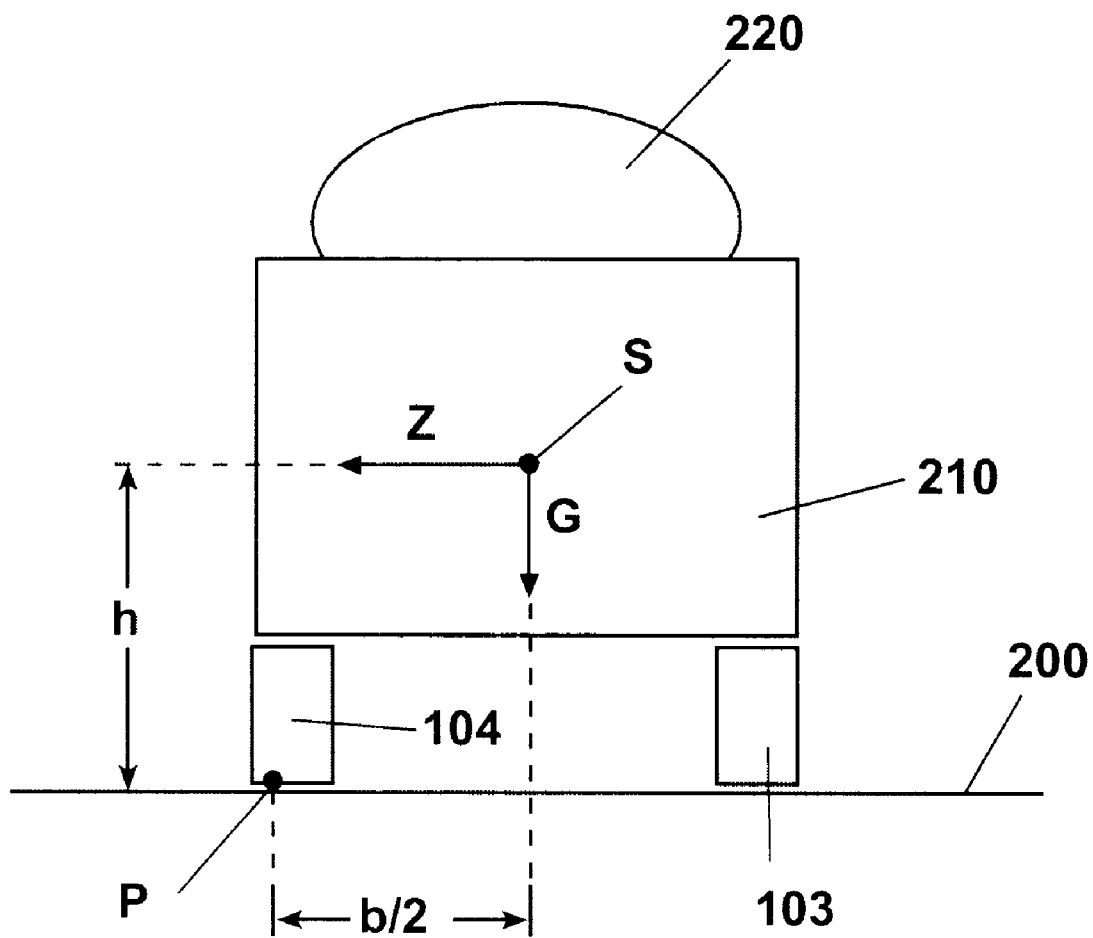
FIG. 2 is a schematic rear view of a vehicle.

FIG. 1 shows a schematic top view of a vehicle in which the present invention can be implemented. Reference numerals 101 to 104 designate the wheels of the vehicle (front left, front right, rear right, rear left), 111 to 114 designate respectively associated wheel sensors, and 121 to 124 designate wheel brakes. 111a to 114a are signal lines which input the signals of the wheel sensors 111 to 114 into a control unit 130 in the broadest sense. The control unit 130 may receive input signals of further sensors 115 to 117. It generates output signals which are used to operate the brakes 121 to 124, for example. Besides, the driving torque may also be adjusted by influencing the engine.

Figure 3:
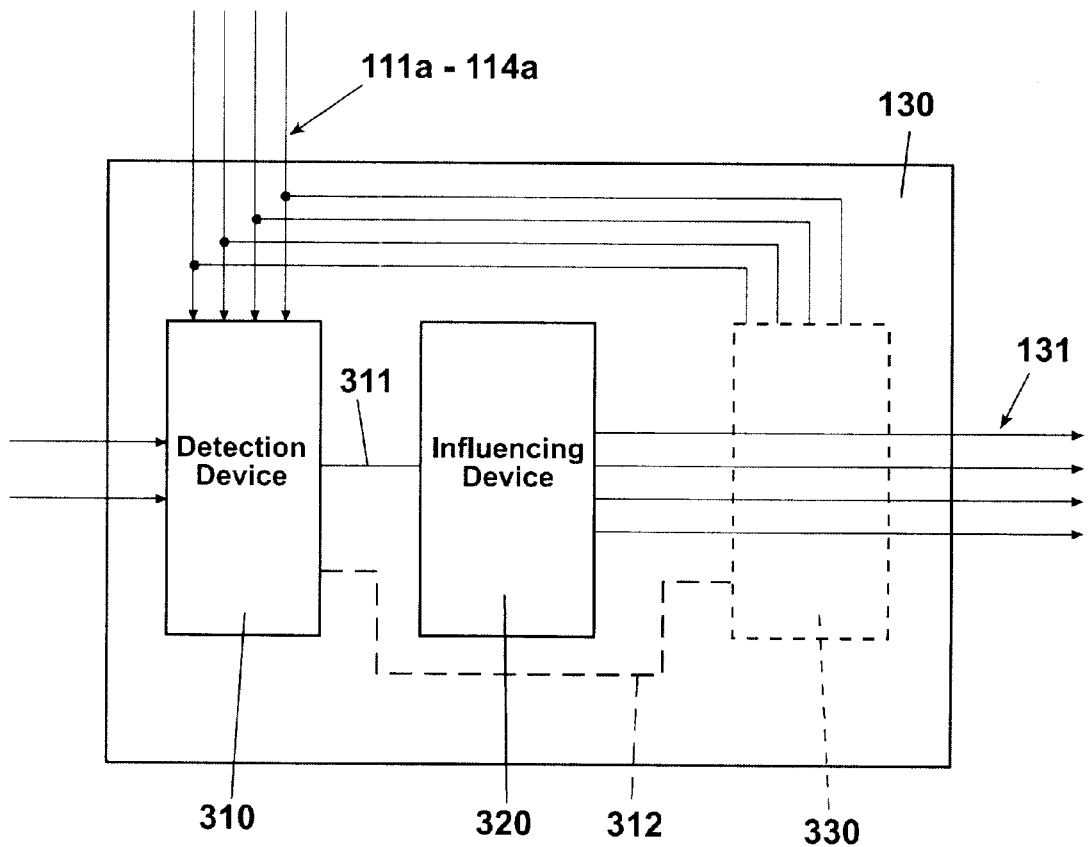
FIG. 3 is a schematic view of an embodiment of a device according to the present invention.

FIG. 3 is a schematic view of a device of the present invention for limiting the transverse acceleration of a traveling vehicle. Reference numeral 310 refers to a detection device for detecting a driving condition with a critical transverse acceleration, 320 designates an influencing device for influencing the braking pressure on at least one wheel or for influencing the driving torque when the critical transverse acceleration has been detected. The latter transverse acceleration usually is a quantity typical of a vehicle which can be determined and/or calculated empirically. To the extent possible, external, definable factors which influence the critical transverse acceleration may be considered.

The detection device 310 may include various detection strategies. Preferably, a system is being examined which detects the vehicle condition with a critical transverse acceleration indirectly or directly from the wheel signals of the wheel sensors 111 to 114. It should be noted as a clarification that the term "wheel signals" refers to signals 111a to 114a which reflect the rotational speed or the track velocity of a rolling wheel. Unless otherwise mentioned, wheel speeds corrected with respect to the wheel diameter or uncorrected wheel speeds may be referred to. When the detection device 310 has detected a driving condition with a critical transverse acceleration, it will issue at least one signal 311 which advises this critical condition to the influencing device 320.

Figure 4:
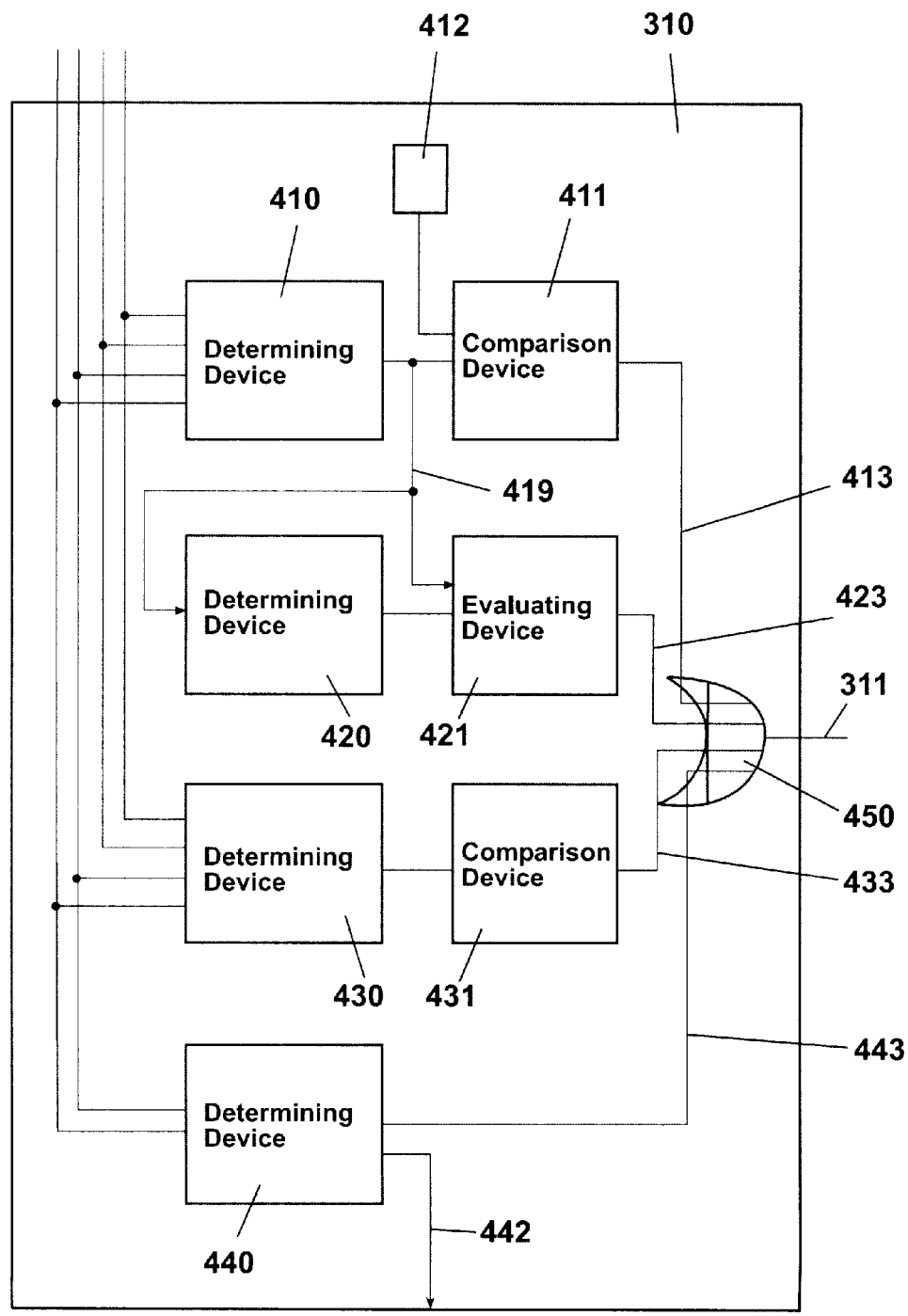
FIG. 4 is a schematic view of an embodiment of a detection device according to the present invention.

One embodiment of the detection device 310 will be described hereinbelow with reference to FIG. 4. The detection device 310 includes in the embodiment shown four determining devices 410, 420, 430 and 440 that respectively determine defined criteria which can give hints at a critical transverse acceleration. Reference numeral 410 designates a first determining device for directly determining the transverse acceleration. An embodiment is shown in which the first determining device 410 receives the four wheel signals. The determining device may be a more complex system which determines from the wheel signals correction factors for the influence of the wheel radii, and that is both short-term and long-term correction factors. Long-term correction factors would indeed compensate for the different wheel radii and, thus, render wheel speeds comparable. Short-term correction factors may occur in a bend, for example. In a bend, the wheel which is on the outside of the bend travels along a larger curve than the wheel that is on the inside of the bend and therefore rotates more quickly. To bring about the comparability with regard to the vehicle reference speed, this geometrical difference would have to be corrected by short-term correction factors. Because cornering is reproduced especially in these short-term correction factors, the transverse acceleration can be determined especially from these factors and from the long-term correction factors and with regard to further input quantities (not shown). This transverse acceleration may be output as signal 419. The first determining device 410 may e.g. implement the algorithm which is described in DE-OS 44 30 458. The contents of this patent application shall be considered as pertaining to the present application. In case the first determining device 410 does not determine the short-term and long-term correction factors on its own, it can poll them where they were produced. In this case, too, reference is made to the wheel speeds. Reference numeral 411 designates a comparison device which compares the determined value of the transverse acceleration with a reference value 412. If the signal on line 419 is greater than the signal exiting from 412, a corresponding signal 413 will be output. Consequently, the value stored in 412 is to be considered as a threshold value for the transverse acceleration. ($Fz \cdot h = m \cdot aqs \cdot h = G \cdot b/2 = m \cdot g \cdot b/2$ primarily results from geometrical considerations, if necessary, in connection with safety thresholds against erroneous detections, road surface inclinations, load variations, etc. ($aqs = g \cdot b/(2 \cdot h)$), wherein aqs is the ideal threshold value for the transverse acceleration which results from the mentioned balance of torques). If controllable, the threshold value 412 can be made dependable on parameters, for example, distribution of load, height of the center of gravity, etc.

Signal 413 indicates that a critical condition exists and may trigger appropriate measures that will be described in the following.

Reference numeral 420 refers to a second determining device. It determines the dynamics of the transverse acceleration. Especially, it may e.g. produce the derivative of the signal prevailing on signal conduit 419 and send the so obtained signal to a first evaluating device 421. A positive dynamics indicates that the transverse acceleration rises. The evaluating device 421 may link this fact to further values, e.g. the already existing absolute value of the transverse acceleration (on signal conduit 419), the driving speed, etc., corresponding to appropriate criteria, and produce another alarm signal 423 therefrom.

A third determining device 430 determines wheel slip values. To this end, it receives (not shown) a vehicle reference speed and produces the difference to the individual wheel speeds. Reference numeral 431 designates second comparison devices which compare the determined slip values with threshold values. A critical transverse acceleration can be identified when the wheel slip values on the bend-inward wheels are in excess of first threshold values and the wheel slip values on bend-outward wheels are below second threshold values, and the second threshold values are preferably lower than the first threshold values. Different threshold values may be taken into account for the wheels of one side of the vehicle (front or rear). When the mentioned conditions are satisfied, the second comparison devices will issue an alarm signal 433.

There may be provision of a fourth determining device 440 in order to detect lifting of a wheel from the road surface. Operation of this device is preferably as follows. Utilizing the fact that when a wheel has lifted from the road surface, it will significantly change its rotational behavior even if a low torque is applied (brake torque, driving torque, drag torque). It may be sufficient to check only the axle that lifts as last (because there are vehicles where a bend-inward wheel lifts while other conditions are stable).

Usually, the front axle is examined because it is the inner wheel which lifts as last because the engine is positioned above the engine axle. Consequently, the determining device 440 would receive the wheel signals 111a and 112a. At defined or definable points of time, the device 440 causes a preferably low increase in the braking pressure of the wheels of the axle under examination. To this end, a signal 442 can be issued which triggers the necessary measures. Increase of the braking pressure is chosen so that it does not leave a considerable effect on a wheel that rolls on the road surface but remarkably slows down a wheel that has lifted. Braking pressures of an amount lower than 10, preferably lower than 5 bar, may be chosen, for example. Following the output of the signal 442, the wheel signals of the wheels of the axle under examination are checked with respect to their operating behavior and, more particularly, with respect to their slip. In case considerable slip amounts are detected on a wheel, another alarm signal 443 can be issued.

Provided the wheel that lifted as last is a driven wheel, an examination of the engine torque can be performed instead of a braking pressure increase. In case it can be ensured by an existing engine interface or by any other appropriate device, that the engine torque (driving or drag torque) acts upon the wheel, the need for testing pressure build-up is obviated, and lifting of this wheel can be detected by way of the slip behavior which corresponds to the engine torque.

Thus, in the embodiment described, alarm signals 413, 423, 433 and 443 are produced a priori independently of each other and can be combined e.g. by an OR gate 450 to one single alarm signal which, as signal 311, is output by the detecting device 310 to the influencing device 320.

It should be noted that a detection device 310 according to the present invention may comprise one or a plurality of the components 410 to 440 which have been described hereinabove with reference to FIG. 4.

When a critical transverse acceleration has been detected, different measures can be taken. Preferably what is desired is a priori a reduction in speed because, according to the formulas mentioned hereinabove, the speed is included as a square in the value of the centrifugal force and, hence, the value of the transverse acceleration ($Z = m \cdot aq$, with aq being the transverse acceleration). Thus, a reduction in speed causes a decrease of the transverse acceleration. Speed reduction may be effected by increasing the brake force and/or reducing the driving force.

It is further possible to increase the bend radius, this being a priori a dangerous intervention because it means a deviation from the desired course of the driver. Provided there is an engine interface (driving torque can be influenced by the control), reduction of the drive power may be induced as soon as a critical transverse acceleration is detected. The result is a decline in the vehicle speed and, thus, in the transverse acceleration.

Additionally or alternatively, increase of the brake force is also possible. Principally, braking can be performed, unless the driver has braked already, because then braking is per se stable. The same applies in the partial braking range (the driver brakes, but within a range where the wheels run stably). Braking pressure can be increased in this range, too. In the brake's fully applied range, however, it may be desirable to follow other influencing strategies.

It can be provided in another embodiment that an active pressure increase is effected on the brakes of the front axle, preferably on the bend-outward wheel, which leads to a limitation of the cornering force on the front axle. The vehicle will thereby skid forwards, and the transverse acceleration will be reduced and the risk of tilting minimized due to the consequent increase of the radius of the circular course.

In a preferred embodiment, the influencing device of the present invention is connected upstream of other control units or controls. In FIG. 3, this is indicated by the dotted box 330 which shall represent these other controls or control units. It may be suitable in full braking to inform the other components 330 qualitatively about the existence of a critical transverse acceleration and to induce a change in the control strategy in these other components. The comprehensive frictions of these components may be utilized thereby. For example, the other components may be induced to develop a 'pressure scissors' within their control strategies to the effect that the oversteering tendency due to a deceleration (rotatory inertia of the braked vehicle about the vertical axis) is counteracted by a torque, for example, by a higher pressure build-up on the outward side of the bend. These considerations apply even if partial braking prevails or there is no braking at all. Thus, it may be desirable to inform qualitatively further components 330 of the brake control that a critical situation exists by way of a signal 312 so that these components can appropriately modify their strategies. The influencing device may then be interpreted such that no direct intervention in the braking pressures or engine torques is made, but that for example nominal values or threshold values of other components are influenced for controlling the brake or the engine.

Inasfar as the braking pressure is influenced directly by the influencing device, it may a priori be desirable under safety aspects and the aspect of avoiding interventions which are disturbing in other respects to perform symmetrical interventions axlewise, i.e., build up braking pressures evenly on the left and the right sides without pressure difference. Reduction of an (active) yaw torque by means of the downstream connected components 330 produces understeering and thereby reduces the transverse acceleration.

To be able to initiate pressure increase for reduction of the transverse acceleration even if the driver does not brake, the brake system should be equipped with an active brake force booster or with a hydraulic pump, if necessary, with separating valves.

Figure 5:
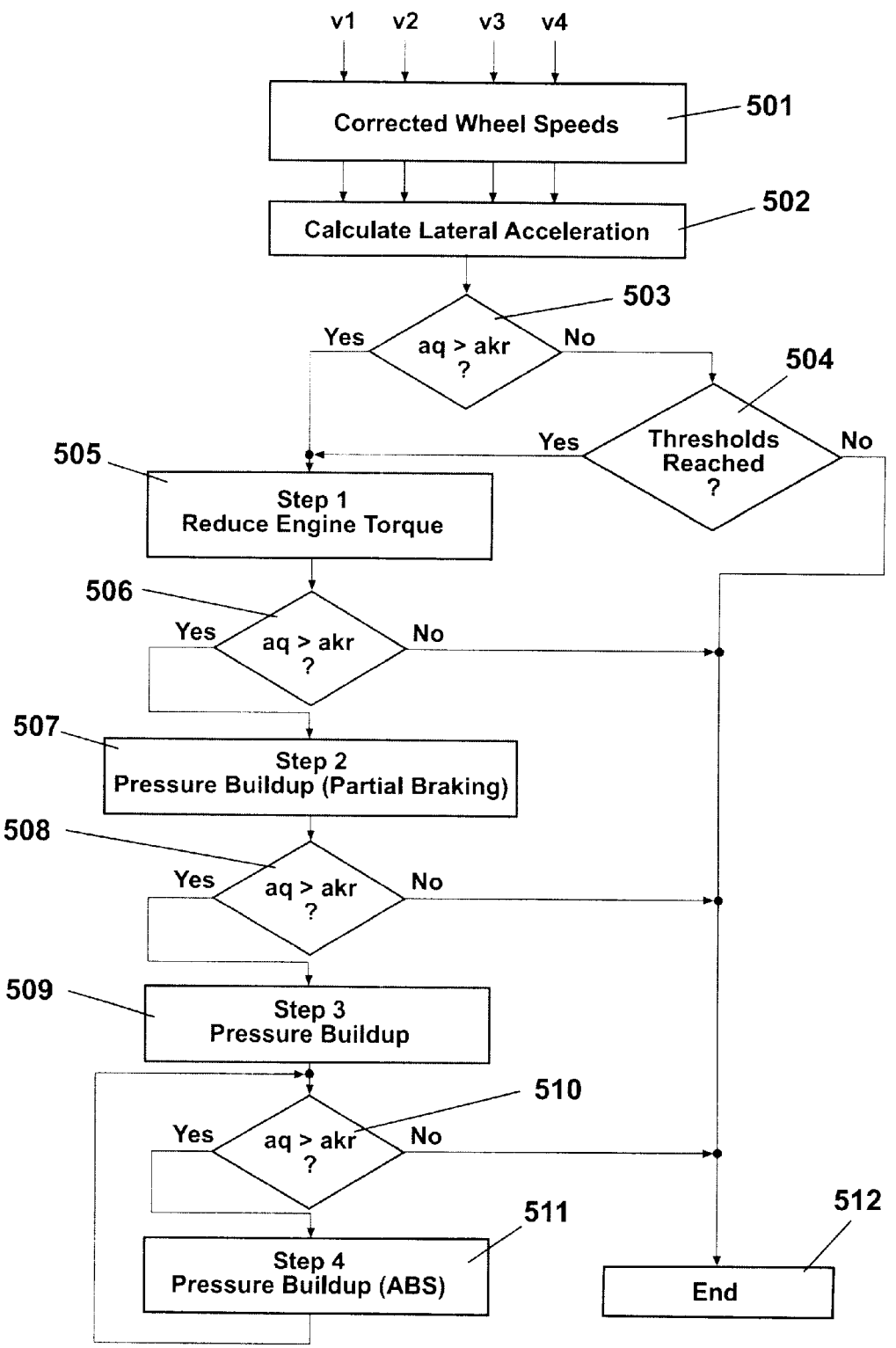
FIG. 5 is a schematic flow chart showing an embodiment of a method according to the present invention.

FIG. 5 shows a schematic view of a flow chart of an embodiment of a method of the present invention. The wheel speeds v1 to v4 (corresponding to signals 111a to 114a) are received and corrected in step 501. Different wheel radii are taken into account in the correction so that comparisons of the values obtained for the individual wheels with reference values or comparisons between the values themselves produce correct results. The transverse acceleration 502 is calculated from the corrected values. A polling is performed with respect to a critical value of transverse acceleration in step 503. This corresponds to the process in the components 410 to 412 in FIG. 4. If the value found is overcritical, the left side of the flow chart will be actuated (steps 505 and following steps). If the value is subcritical, another polling with respect to the wheel slip values may be performed. This basically corresponds to the processes in the components 430 and 431 in FIG. 4. This permits detecting critical transverse accelerations which do not result from the above interrogation. For example, a high roof load 220 may cause an increase of the center of gravity S (h increases). However, the threshold value in 503 will have been rated for a vehicle without a high roof load so that it will have been chosen to be higher. Consequently, it may be the case that the result of polling 503 is subcritical, but polling 504 nonetheless leads to a critical result due to major slip on the inner wheels (because of the high roof load). Steps 505 to 510 may be actuated even then. The procedure is terminated when a subcritical transverse acceleration aq is detected again. After detection of a critical situation ("yes" in 503 or 504), graduated measures can be initiated. Initially, the engine torque is reduced in 505. Again, the transverse acceleration can be interrogated (step 506). If it continues to be overcritical ("yes" in 506), the deceleration is increased in addition to the reduction of the engine torque by a pressure increase in step 507. This may still take place in the partial braking range. If again overcritical transverse acceleration values are encountered in step 508, further braking strategies, especially braking strategies which achieve a stable and/or understeering behavior, may be invoked in step 509. If again overcritical values are encountered in step 510, deceleration optimization can be initiated in step 511 and maintained until subcritical transverse acceleration values are reached.

The illustrated graduation of measures is meant as an example. Individual or several of the graduations may be omitted or modified in compliance with the other conditions of the brake system.

Implementation of the mentioned devices may be effected by a digital controller. Thus, the illustrations in FIGS. 3 and 4 may be interpreted as logic diagrams.

What is claimed is:

1. A method of limiting the transverse acceleration of a traveling vehicle, comprising the steps of:
   1) detecting a driving condition having a critical transverse acceleration,
   2) influencing the braking pressure on at least one wheel or influencing the driving torque when the driving condition with a critical transverse acceleration has been detected,
   3) determining the transverse acceleration, wherein determining the transverse acceleration includes determining the wheel speeds of vehicle wheels, and
   4) comparing the determined transverse acceleration with a threshold value for detecting a driving condition with a critical transverse acceleration, and wherein the driving condition with a critical transverse acceleration is detected when the determined transverse acceleration exceeds the threshold value.

2. Method as claimed in claim 1, further including using the wheel speed values for correcting values influence by the wheel radii.

3. Method as claimed in claim 2, further including determining the transverse acceleration in dependence on short-term and long-term correction factors of the wheels of one axle.

4. Method as claimed in claim 1, including determining the gradient of the transverse acceleration for detecting a driving condition with a critical transverse acceleration, wherein the driving condition with a critical transverse acceleration is detected when the determined gradient satisfies defined conditions.

5. Method as claimed in claim 1, including determining the contact behavior of a wheel on the road surface and using the determined wheel behavior for detecting a driving condition with a critical transverse acceleration, wherein the driving condition with a critical transverse acceleration is detected when the wheel has lifted from the road surface.

6. Method as claimed in claim 5, wherein determining the contact behavior of a wheel on the road surface, is conducted when defined conditions prevail, braking pressure is lower than 10 bar, and the slip behavior of the wheel is checked.

7. Method as claimed in claim 1, further including initiating an unsymmetrical braking pressure reduction or a driving torque decrease when a driving condition with a critical transverse acceleration has been detected and when full braking or partial braking prevails.

8. A method of limiting the transverse acceleration of a traveling vehicle, comprising the steps of:
1) detecting a driving condition having a critical transverse acceleration,
2) influencing the braking pressure on at least one wheel or influencing the driving torque when the driving condition with a critical transverse acceleration has been detected,
3) determining the wheel slip values, and
4) comparing said wheel slip values to at least one of a plurality of threshold values for detecting a driving condition with a critical transverse acceleration wherein the driving condition having a critical transverse acceleration is detected when the wheel slip values on the bend-inward wheels are in excess of a first threshold value and the wheel slip values on the bend-outward wheels are below a second threshold value.

9. A method of limiting the transverse acceleration of a traveling vehicle, comprising the steps of:
1) detecting a driving condition having a critical transverse acceleration,
2) influencing the braking pressure on at least one wheel or influencing the driving torque when the driving condition with a critical transverse acceleration has been detected, and
3) initiating a braking pressure increase or a driving torque decrease when a driving condition with a critical transverse acceleration has been detected, wherein the braking pressure changes include initiating symmetrical braking pressure changes on one axle.

10. A method of limiting the transverse acceleration of a traveling vehicle, comprising the steps of:
1) detecting a driving condition having a critical transverse acceleration,
2) influencing the braking pressure on at least one wheel or influencing the driving torque when the driving condition with a critical transverse acceleration has been detected, and
3) understeering the vehicle when a driving condition with a critical transverse acceleration has been detected, wherein the understeering is achieved by building up different brake forces on the two vehicle sides or by a controlled development of a yawing torque.

11. A method of limiting the transverse acceleration of a traveling vehicle, comprising the steps of:
1) detecting a driving condition having a critical transverse acceleration,
2) influencing the braking pressure on at least one wheel or influencing the driving torque when the driving condition with a critical transverse acceleration has been detected, and
3) effecting the reduction of the transverse acceleration by an active braking pressure increase on the front axle for limiting the cornering forces on the front axle.

12. A device for limiting the transverse acceleration of a traveling vehicle, comprising:
a detection device for detecting a driving condition with a critical transverse acceleration, and
an influencing device for influencing the braking pressure on at least one wheel or for influencing the driving torque when the detection device has detected a driving condition with a critical transverse acceleration, wherein the detector device includes a first determining device for determining the transverse acceleration and a first comparison device for comparing the determined transverse acceleration with a threshold value, and wherein the first determining device operates in response to signals from wheel sensors.

13. Device as claimed in claim 12, further including a correction device which corrects wheel speed values with respect to the influence of the wheel radii.

14. Device as claimed in claim 13, wherein the first determining device uses correction values in the correction device.

15. Device as claimed in claim 12, wherein the detection device includes a second determining device for determining the gradient of the transverse acceleration, and a subsequent first evaluating device.

16. Device as claimed in claim 15, wherein the detection device includes a third determining device for determining the wheel slip values, and second comparison devices to compare the determined wheel slip values with one or a plurality of threshold values.

17. Device as claimed in claim 16, wherein the detection device includes a fourth determining device for determining the contact behavior of a wheel on the road surface and a subsequent second evaluating device.

18. Device as claimed in claim 17, wherein the fourth determining device builds up braking pressure of less than 10 bar on a wheel, wherein the fourth determining device includes a testing device which checks the slip behavior of the wheel.

19. Device as claimed in claim 12, wherein the influencing device initiates a braking pressure reduction on one side or a driving torque decrease when a driving condition with a critical transverse acceleration has been detected and when full braking prevails.

20. A device for limiting the transverse acceleration of a traveling vehicle, comprising:
a detection device for detecting a driving condition with a critical transverse acceleration, and
an influencing device for influencing the braking pressure on at least one wheel or for influencing the driving torque when the detection device has detected a driving condition with a critical transverse acceleration, wherein the influencing device initiates a braking pressure increase or a driving torque decrease when a driving condition with a critical transverse acceleration has been detected and in the absence of braking or partial braking and initiates symmetrical braking pressure variations on one axle and issues at least one signal which indicates the critical transverse acceleration to a control unit.

21. A device for limiting the transverse acceleration of a traveling vehicle, comprising:
a detection device for detecting a driving condition with a critical transverse acceleration, and
an influencing device for influencing the braking pressure on at least one wheel or for influencing the driving torque when the detection device has detected a driving condition with a critical transverse acceleration, and
a device which permits an active braking pressure build-up.

* * * * *